United States Patent [19]

Gilman

[11] 4,304,268
[45] * Dec. 8, 1981

[54] INSULATION TUBES AND PROCESS OF MAKING SAME

[76] Inventor: Richard Gilman, c/o The Gilman Corporation, Gilman, Conn. 06336

[*] Notice: The portion of the term of this patent subsequent to Dec. 16, 1997, has been disclaimed.

[21] Appl. No.: 52,345

[22] Filed: Jun. 27, 1979

Related U.S. Application Data

[63] Continuation-in-part of Ser. No. 3,262, Jan. 15, 1979, Pat. No. 4,239,064.

[51] Int. Cl.³ .................. F16L 9/16; B65N 81/00; D03D 13/00
[52] U.S. Cl. .................. 138/154; 138/129; 138/149; 156/190; 156/195; 428/36; 428/212; 428/222
[58] Field of Search .................. 138/129, 149, 154; 428/36, 222, 212; 156/190, 195, 344

[56] References Cited

U.S. PATENT DOCUMENTS

| | | | |
|---|---|---|---|
| 3,247,869 | 4/1966 | Bogerhausen et al. | 156/195 |
| 3,616,123 | 10/1971 | Reynolds et al. | 156/195 |
| 3,654,061 | 4/1972 | Berwanger | 156/195 |
| 3,716,435 | 2/1973 | Jensen et al. | 156/195 |
| 4,218,814 | 8/1980 | Hodapp | 138/149 |
| 4,239,064 | 12/1980 | Gilman | 428/36 |

Primary Examiner—William R. Dixon, Jr.
Attorney, Agent, or Firm—McAulay, Fields, Fisher, Goldstein & Nissen

[57] ABSTRACT

A discrete tube is provided which can be readily torn into a length of coiled insulation wrapping. The tube comprises at least two plies of a firm, foamed thermoplastic polymer web which had been set into a coiled configuration. The plies are welded together on their radially facing adjoining surfaces to form the tube, but the plies are offset and the axially facing edges of each ply are not welded together, such that the nonwelded edges form a junction line along a central portion of the radially facing edge of the adjacent ply.

The tube is preferably formed by heat sealing the two plies together, while simultaneously heat setting each ply into the coiled configuration. The laminated coil resiliently maintains the desired configuration.

22 Claims, 6 Drawing Figures

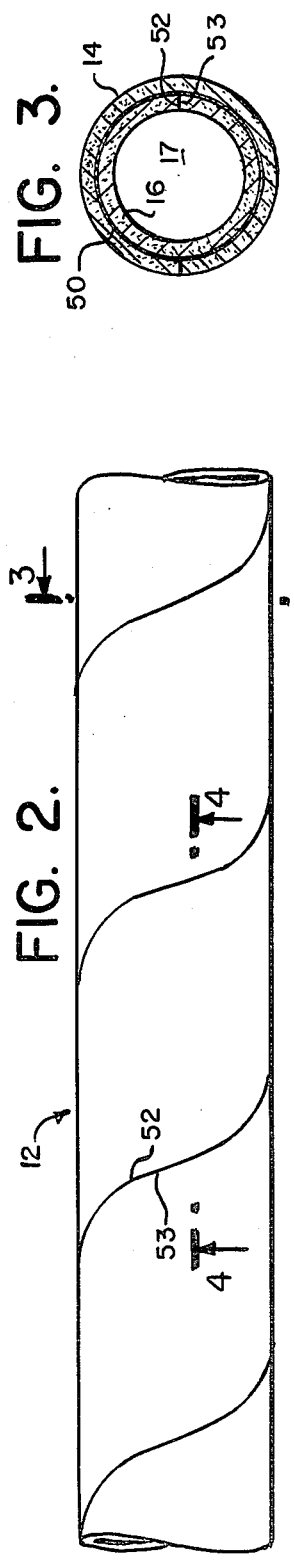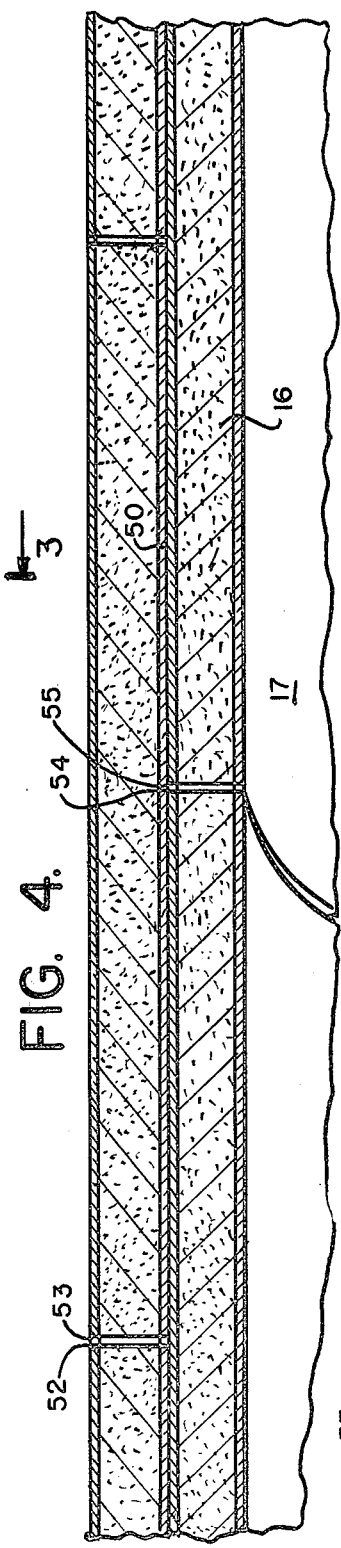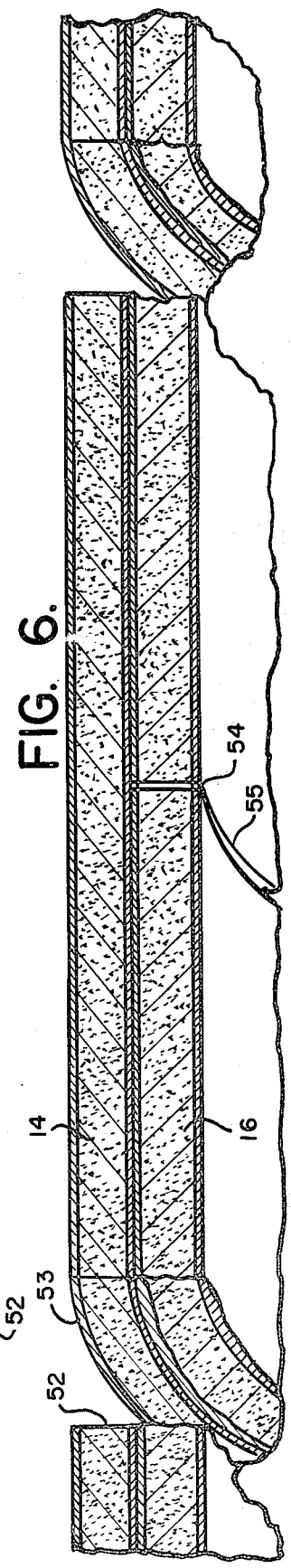

INSULATION TUBES AND PROCESS OF MAKING SAME

This is a continuation-in-part of copending U.S. application Ser. No. 3,262, filed Jan. 15, 1979, now U.S. Pat. No. 4,239,064.

The present invention relates to a compact and easily applied insulation material which combines the advantages of easy application, high insulating ability and easy storage.

The availability of a suitable insulating material to be applied to pipes and other equipment already in place, including not only both hot and cold water pipes, but also water heaters, air heating ducts and air heating furnaces, is extremely limited. Such insulation materials include rolls of tape that must be tied or glued onto the outer circumference of, for example, a pipe, after being wrapped around the pipe. The application and securing of such insulating tape to a pipe, is extemely cumbersome, often requiring the use of three hands. Thus, it cannot be readily applied by a single individual, i.e., home owner. Another type of insulating product, especially designed for pipes, is a cylindrical tube having a central opening specifically sized for each size of pipe. Thus, it is necessary not only to buy different diameter cylinders for each size pipe on a particular job, but also to cut the cylinders for application between joints, bends, T's, etc.

In accordance with the present invention, an insulating material is provided in extremely handy format. The present invention provides a discrete tube of insulating material comprising at least two coiled plies of insulating material, each ply being formed of a web of foamed thermoplastic polymer set into a coiled configuration, a radially facing surface of each web ply in the tube is welded to a radially facing surface of the adjoining web ply, but the axially facing edges on each coiled web ply are not welded together. In coiling the plies to form the tube, the adjacent plies are so arranged that the coils of one ply are offset from the coils of an adjacent ply. The junction line between the unwelded axial edges of each ply extends along the radially facing surface of the immediately adjacent ply. When it is desired to apply the insulating material to a pipe, that is already in place, the tube can be sharply pulled from each end, which results in the application of a sharp axial tensile stress to the tube; the tube is designed to tear along an unwelded junction line so as to form a free, multi-ply coil suitable for wrapping about a pipe or the like.

In accordance with the process of the present invention, an insulation tube is formed, capable of being readily pulled into a free helical coil, by a process comprising the following steps: heat is applied to a major face of each of the plurality of foamed polymer webs to be joined to form the multi-ply tube wall such that the face is heated to above the softening point of the polymer, i.e., a temperature at which heat sealing can occur. The two webs are then coiled together in an overlapping, offset relationship to form the multi-ply tube, the heated surfaces of the webs being placed in contact such that the webs are welded together along the contacting major faces. The individual webs are preferably heated such that the outer skin of each web is softened sufficiently to enable welding together of the two plies when the major surfaces are pressed together. Although the interior of the foam is also heated to just soften the resin, care must be taken to avoid rupturing the interior structure of the foam. The transverse edges of each web, although softened, should not be pressed together, thus avoiding welding. Thus, the transverse edges of each coiled web, although they may be placed in contact, do not form a welded junction. The adjacent transverse edges of each coiled ply are free and form a helical, unwelded junction line, extending along the radially facing surface of the adjacent ply.

The thermoplastic polymer forming each web ply of the tube can be, e.g., polyvinyl chloride, or a polyolefin, such as an ionomer resin, polyethylene, polypropylene or polybutylene. The polymer can be any of a variety of high density, medium density or low density such polyolefins. Although generally the two plies are formed of the same polymer material, the tube can be formed of plies ot two different polymers. The desirability of using two different polymers can arise when the inner and outer surfaces of the tube are subjected to drastically different environments, such as extreme heat and extreme cold, or to moisture and dry air. A particular desired appearance can make one polymer more desirable for an outer ply. It is only necessary that the two types of polymers be compatible and capable of being welded or fused together.

Similarly, copolymers or mixtures of polymers can be used to form the plies. A mixture of an ionomer with a relatively rigid* thermoplastic resin can further improve the tearability of the tube along the desired lines. Useful such thermoplastic polymers include, for example, polystyrene (including crystal polystyrene and high impact polystyrene), acrylic resins, including methyl methacrylate. The polystyrene ionomer combination is especially useful in simplifying manufacturing as described herein.

*having a lower tensile elastic modulus and percent elongation

Each web ply is preferably formed of a closed, cellular foam having a relatively dense and moisture-impervious outer layer, or skin. Each foam web ply is preferably at least about 1 mm. thick and most preferably at least about 2.5 mm. thick. The thickness must be sufficient to provide the desired degree of insulation, but not to be so thick as to be undesirably cumbersome in operation. Thus, it is most preferred that the individual plies have a thickness of not greater than about 4 cm., and the composite, multi-ply tube has a wall thickness of not greater than about 12 cm. It must be pointed out that the plies need not be of the same thickness, and it is preferred in the two-ply, most preferred, embodiment, that the inner ply is of substantially lesser thickness than the outer ply.

The foamed polymer material should have sufficient resilience after it is set into the coiled configuration, that it will recoil back into the coiled configuration upon being pulled out straight.

The various features and advantages of the present invention will become more apparent from the accompanying drawings and the following verbal descriptions of preferred embodiments of the present invention. The descriptions and drawings, and the following verbal descriptions of preferred embodiments of the present invention. The descriptions and drawings, and the following examples are given to show merely preferred examples of the present invention and are not intended to be exclusive of the scope thereof:

FIG. 2 is a side view of a laminated tube in accordance with the present invention;

FIG. 3 is a cross-sectional view of the tube taken on lines 3—3 of FIG. 2;

FIG. 4 is a somewhat enlarged, partial cross-sectional view of the tube taken along lines 4—4 of FIG. 2;

FIG. 5 is a side view of the tube of FIG. 2 in its torn, free coil configuration; and FIG. 6 is a somewhat enlarged, cross-section taken along lines 6—6 of FIG. 5.

Figure 1:
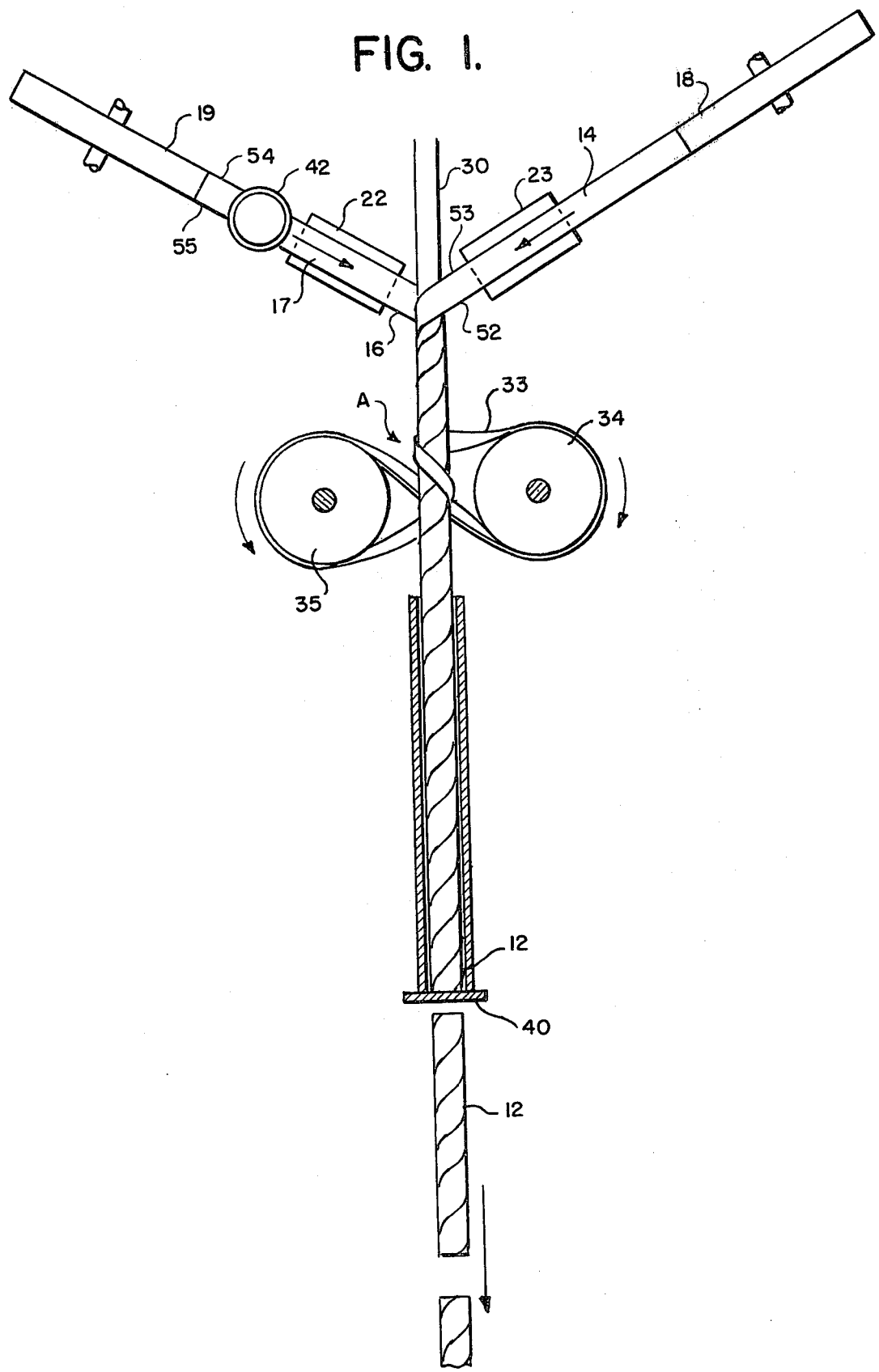
FIG. 1 is a diagrammatic sketch of apparatus used for forming the laminated tube structure of the present invention.

In the process of FIG. 1, a two-ply tube is being formed, the final product being indicated by the numeral 12. Two webs of ionomer foam 14, 16, are being fed from rolls of such webs 18, 19, respectively. A major surface of each of the foam webs 14, 16 is passed over a conventional foil element heater 22, 23. The foil electric heaters are desirable because of their ability to quickly heat up to the desired temperature when activated and to cool down when deactivated. The foam is preferably passed extremely close to the foil heating element so as to quickly heat the adjacent surface, and the speed at which the foam passes the heating element is sufficient to insure that the interior portions of the web are heated to above the softening temperature of the resin, but not above the collapsing temperature, i.e. where the foam collapses or where the foam cell walls rupture.

The two foam webs 14, 16 are fed between the stationary mandrel 30 and the twisted continuous belt 33. The belt 33 continuously moves in the twisted configuration around a drive roller 34 and driven roller 35, and around the loop (indicated by the letter "A") around the webs 14, 16 and mandrel 30. The two foam webs 14, 16 are fed into the continuous twisted belt annulus such that the two heated surfaces are in contact and the cool lubricated, upper surface 17 of foam web 16 is in contact with the stationary mandrel 30.

The foam webs 14, 16 are contacted such that the transverse edges of the inner web 16 are in contact with a central portion of the heated surface of web 14. Thus, an offset spiral is formed as is shown in FIGS. 2 through 4.

The motion imparted to the coiled laminated webs 14, 16 by the twisted continuous belt 33 about the mandrel 30 moves the final welded tube 12 along the mandrel to the end where an air actuated guillotine 40 cuts off welded tubes 12' of desired lengths.

To obtain any necessary lubrication between the internal circumference of the welded tube and the mandrel 30, as the coiled laminate moves along the mandrel 30, a lubricating oil is dripped down upon the upper surface 17 of web 16 by a dispenser 42.

Sufficient pressure is applied between the two foamed webs 14, 16 so as to cause the fusion of the adjoining heat-softened surfaces, merely by action of the continuous belt 33 drawing the two webs from the rollers 18, 19, respectively, under tension.

When utilizing an ionomer resin foam, it is preferred that the mating surfaces of the foam webs 14, 16 be heated to a temperature of at least about 88° C., i.e., the softening temperature of the most common ionomer resin. Generally, ionomer resins should not be treated at temperatures above about 115° C.; however, the mating surfaces can be heated by elements 22, 23 to temperatures as high as about 275° F., or even higher, for short periods, without damaging the foam structure.

In one preferred embodiment of this invention, each ionomer foam web 14, 16 is about 2.5 inches wide and the mandrel has a diameter of about 1¼ inches. The continuous belt 33 has a width of approximately 1.5 inch and turns at a speed sufficient to produce the welded tube product 12 at a rate of approximately 40 feet per minute. The inner foam web is about ⅛ in. thick, and the outer foam web is about 3/16 in. thick.

When other polymer resins are being utilized in forming the foam webs, suitable softening temperatures and production rates should be used. Those skilled in the art can readily determine the required temperatures and speeds of production from the information set forth herein.

The product formed by the process depicted in FIG. 1 is shown in FIG. 2, to be a coiled welded tube formed of two plies of foam webbing, the inner ply being web 16, the outer ply being web 14. The two plies are welded, or fused, together along substantially their entire radially facing surfaces, depicted in FIG. 3 as a heat sealed or welded joint 50. The transverse edges 52 to 55 of each ply are not welded together, and it is crucial that the heat applied to each web be only sufficient to soften the adjacent surface without softening the interior or transverse edge of each web. As is further made clear by the cross-sectional view of FIG. 4, the plies are offset. As can be seen from FIGS. 3 and 4, the two plies are substantially offset by half the width of each ply, and the two plies are of substantially equal width. Thus, the transverse edge junction line 52-55 of each ply extends along substantially the midpoint of the adjacent ply web. The heat seal, or weld 50, extends substantially across the entire surface of each ply, in the preferred embodiment depicted. It is possible, of course, to only form the weld or heat seal over a portion of the contacting surfaces, for example, by heating only the center portion of each foam web by utilizing heating elements that are significantly narrower than the width of each web. The transverse edges 52-55 of each coiled web ply are clearly shown as not being joined or welded. A gap is shown in the magnified FIGS. 4 and 6 between the adjacent transverse edges 52-55, for purposes of clarity. However, as is shown in FIG. 3, the transverse edges 52-55 are preferably substantially in contact with each other. It is, of course, possible to leave a gap between the transverse edges 52-55 of the coiled ply, if desired.

As is clearly shown in FIG. 4, the preferred ionomer foam, as it is most commonly prepared, includes a major central porous portion of a substantially continuous density. The outer major surfaces, e.g., 17, include a relatively dense skin which appears to the eye to be relatively smooth and continuous. The transverse edges 52-55, contrariwise, show substantially the internal pore structure of the foam, and thus appear to be relatively rough and cavitied. Along the areas that are heat sealed 50, between the plies, the two plies form a continuous sheet of material from the internal circumference 17 to the outer circumference of the tube. Thus, the tensile strength of the welded plies is equal to the strength of a material having the combined thickness of the two plies. However, along the unwelded junction lines between the transverse edges of each web 52-55, there is only a single thickness of material. Accordingly, when a sharp axial pull is exerted upon the tube, i.e., in the directions shown by the arrows XY in FIG. 5, for example, by grabbing the two ends of the tube and pulling apart the tube will tear along the junction lines 52, 53 as is shown in FIGS. 5 and 6. In these preferred embodiments, it is the interior web 16 that will tear along the junction line 52, 53 of the outer web 14, as is clearly shown in FIGS. 5 and 6. The tear occurs across the center portion of the inner ply 16 along the line generated by the junction 52, 53. It, of course, must be emphasized that where the heat seal or weld 50 between the plies 14, 16 does not extend over the entire surface areas of the plies, then the tear can occur anywhere over the area that is not heat sealed, i.e., over the area of single ply thickness.

In another preferred embodiment, each ply has a directional, or oriented, structural strength, such that it is stronger in tension in one direction than in the other. By placing the orientation axes of the two plies transverse to each other, an even greater strength differential can be obtained between the two plies, and the ply which is to be torn, i.e., the inner ply or the outer ply, can be tailored by orienting the ply to be torn in the advantageous direction to permit tearing of its fabric. For example, a means of forming an ionomer foam web, which is itself a transverse laminate, is set forth in Application Ser. No. 863,849, filed Dec. 23, 1977, and now U.S. Pat. No. 4,137,348.

The tube winding device shown in FIG. 1 for forming the coiled tube, is conventionally used in the paper tube manufacturing industry. Those skilled in that art are commonly aware of the method of manufacturing and utilizing such a device.

Examples of such devices are the "Spiral Tube Winder", manufactured and sold by Rockport Machine and Tool Co., Cleveland, Ohio, and by Paco Winders, Inc. The primary difference between the operation of the cardboard tube winding device and the device depicted herein, is that for the paper tube an adhesive is required. An adhesive of the commonly available type, i.e. requiring evaporation of a solvent, is not possible with the substantially impervious plies of ionomer foam, whether ionomer alone or admixed with another thermoplastic resin.

After the tube is formed on the mandrel and cut into the desired lengths, the ultimate user can take the tube and by applying a sharp axial force, i.e., pulling apart the two ends of the tube, the tube will tear along the junction lines 52, 53 to form a coil. Because the thermoplastic foam is heat set into the coiled pattern, even after it is pulled into a straight line it will coil about a pipe around which it is wrapped, thus avoiding the problem of rolled tape, which must be held in place around the pipe as it is being secured, and further requires a separate vapor barrier. Indeed, as long as the pipe about which it is wrapped has a greater outside diameter, then the internal diameter of the tube 12 as manufactured herein, the tube will hold itself firmly to the outer surface of the pipe even before it is tied, due to its resiliency.

The relative dimensions of web width and insulation tube diameter can vary, in accordance with practice. The dimensions shown are merely exemplary and result in an extremely efficient operation.

The lubricating oil applied by applicator 42 onto the upper surface of web 16 can be any type of lubricant as long as it is completely inert to the web upon formation of the tube or during storage. Thus, any type of, for example, silicon oil, a vegetable oil, preferably saturated to avoid long term storage rancidity, mineral oil, or other lubricant which will avoid any binding or sticking of the inner circumference 17 of the tube 12 to the mandrel 30, can be used.

It is further pointed out that more than two webs of foam can be wrapped about each other to form a multiply insulation tube. It is clear, that because of the flexible resilience of the laminated tube material, after it is torn, the insulation can be applied to substantially any shape or diameter.

A most preferred foam web is formed from a mixture of an ionomer resin and polystyrene resin, in proportion by weight of ionomer: polystyrene, in a range of from about 95:5 to about 60:40, and preferably about 90:10 to about 70:30. The thickness of each ply in the preferred two-ply roll is preferably from about 2.5 mm to about 8 mm.

In one example of such a most preferred embodiment, foam webs are formed from a mixture of 80% ionomer (DuPont 1801, sold by DuPont de Nemours & Co.), and 20% polystyrene, "High Impact" Polystyrene, e.g., a mixture of polystyrene and a synthetic butadiene rubber. The webs are formed by conventional procedures for forming ionomer foams. The procedure described above for ionomer foam is utilized to form a two-ply tube, wherein the inner ply is ⅛ inch thick, and the outer ply is 3/16 inch thick. It is preferred that the mating surfaces of the two foam webs be heated to a temperature of at least about 225° F. and most preferably at least about 275° F. Varying the proportions of the resins, or the molecular weight or other characteristics of each resin mixed, often requires a change in the operating temperatures, or other process parameters. Such a change can be readily determined by one skilled in the art.

The use of the mixed ionomer-relatively rigid thermoplastic foam, in place of an ionomer foam alone, results in a roll which can be more readily torn by the end user to form the insulating strip, but which maintains sufficient resilience to securely grip a pipe of varying diameters. Further, during the manufacturing operation, with the polystyrene/ionomer mixture especially, the hot wire-cutting of the spools need not be so carefully controlled to avoid tearing of the spools.

The preferred insulation tubes in accordance with the present invention can be utilized directly for insulating pipes buried underground because of the relatively inert nature of the ionomer resin. Because of the resilience of these tubes, multiple layers of the coiled tube material can be wrapped around the pipe, permitting substantially unlimited insulating effect. Further, the tubes can be readily formed in almost any diameter, including a 25-inch diameter, or even greater. In order to improve the light-resistance of the ionomer, when exposed to sunlight, a variety of known additives, including about 5% by weight of carbon black, can be added to the resin during compounding.

The procedure defined above can be carried out for a variety of other types of foam polymer webs, for example, polyolefins, such as high-density and low-density polyethylene, and polypropylene. Polyvinyl chloride material can also be used if desired. The manner in which each foamed ply is formed, and the material of which it is formed, does not form a crucial part of the present invention, except as indicated above.

The patentable embodiments claimed in this invention are as follows:

1. An insulation tube comprising at least two welded coiled plies, each ply being formed of a web of a foamed thermoplastic mixture of resins comprising a major proportion of an ionomer and a minor proportion of a rigid thermoplastic resin having a lower tensile elastic modulus and percent elongation than the ionomer set into a coiled configuration, a radially facing surface of each web is welded to a radially facing surface of an adjoining web, but the axially facing edges on each coiled web are not welded together, adjacent plies being arranged such that the coils of one ply are offset from the coils of an adjacent ply, and a line defining the junction between the unwelded axial edges of each ply extends along the radially facing surface of an immediately adjacent ply, whereby applying a sharp axial tensile stress to the tube causes a tearing of one ply along the junction line defined by an adjacent ply so as to form a free, multi-ply coil suitable for wrapping about a pipe and the like.

2. The tube of claim 1, wherein each ply has a thickness in the range of from about 2.5 millimeters to about 40 millimeters.

3. The tube of claim 1, wherein each web ply is formed of a structurally oriented material.

4. Process for forming a tube capable of being readily pulled into a free helical coil, the process comprising:
  (1) heating to above the heat sealing temperature, a first web and a second web each formed of a foamed thermoplastic mixture of resins comprising a major proportion of an ionomer and a minor proportion of a rigid thermoplastic resin having a lower tensile elastic modulus and percent elongation than the ionomer;
  (2) coiling the two webs in an overlapping, offset relationship to form a multi-ply tube, each web forming one ply, and welding the adjacent surfaces of the two webs together but leaving free the transverse edges of each coiled web, whereby the unwelded junction between adjacent edges of each ply define a curved line along the radially facing surface of the adjacent ply in the tube.

5. An insulation tube comprising at least two welded coiled plies, each ply being formed of a web of a foamed thermoplastic mixture of resins comprising a major proportion of an ionomer and a minor proportion of a polystyrene set into a coiled configuration, a radially facing surface of each web is welded to a radially facing surface of an adjoining web, but the axially facing edges on each coiled web are not welded together, adjacent plies being arranged such that the coils of one ply are offset from the coils of an adjacent ply, and a line defining the junction between the unwelded axial edges of each ply extends along the radially facing surface of an immediately adjacent ply, whereby applying a sharp axial tensile stress to the tube causes a tearing of one ply along the junction line defined by an adjacent ply so as to form a free, multi-ply coil suitable for wrapping about a pipe and the like.

6. The tube of claim 5, wherein the proportions of ionomer: relatively-more-rigid-resin polymer is in the range of from about 95:5 to about 60:40.

7. The tube of claim 6, wherein the proportions are in the range of from about 90:10 to about 70:30.

8. The tube of claim 5 wherein the plies are of different thicknesses.

9. The tube of claim 8 wherein the inner ply is of substantially lesser thickness than the outer ply.

10. The tube of claim 5, wherein the weight ratio of ionomer-to-polystyrene is in the range of from about 70:30 to about 90:10.

11. Process for forming a tube capable of being readily pulled into a free helical coil, the process comprising:
  (1) heating to above the heat sealing temperature, a first web and second web each formed of a foamed thermoplastic mixture of resins comprising a major proportion of an ionomer and a minor proportion of a polystyrene;
  (2) coiling the two webs in an overlapping, offset relationship to form a multi-ply tube, each web forming one ply, and welding the adjacent surfaces of the two webs together but leaving free the transverse edges of each coiled web, whereby the unwelded junction between adjacent edges of each ply define a curved line along the radially facing surface of the adjacent ply in the tube.

12. The method of claim 11 wherein the plies are heat-welded together by preheating the surface of each web to above the heat sealing temperature prior to coiling together.

13. The method of claim 11 wherein the webs are closely coiled such that the adjacent transverse edges are in contact.

14. The method of claim 11 wherein each web has a skinned surface that is pre-heated to above the heat sealing temperature at a rate to preclude the heating of the foam interior to above the collapsing temperature.

15. The process of claim 11 wherein the two webs are coiled about a tubular form.

16. The process of claim 12, wherein the two foam web plies are each heated to at least the heat setting temperature prior to coiling the tapes together.

17. The process of any of claims 4, 11, 13, 14, 15 or 16, wherein the webs are each formed of a mixture of an ionomer and polystyrene in weight proportions of from about 95:5 to about 60:40, ionomer to polystyrene.

18. The tube of any of claims 1, 10 or 5 comprising only two plies.

19. The tube of claim 18 wherein the inner ply is to be torn along the spiral junction line of the outer ply.

20. The tube of claim 18 wherein the major surfaces are welded by heating at least to the heat sealing temperature.

21. The tube of claim 19 wherein the axial edges are in contact.

22. The tube of any of claims 1, 10 or 5, wherein each radially facing surface is formed of a skin portion having a density substantially greater than the average density of the foam ply.

* * * * *